United States Patent [19]

Stanley et al.

[11] Patent Number: 4,539,809

[45] Date of Patent: Sep. 10, 1985

[54] FUEL PUMP VENT DRAIN SYSTEM

[75] Inventors: Richard L. Stanley, Mason; George R. Henry, Loveland, both of Ohio

[73] Assignee: The United States of America as represented by the Secretary of the Air Force, Washington, D.C.

[21] Appl. No.: 566,445

[22] Filed: Dec. 28, 1983

[51] Int. Cl.³ .............................................. F02G 3/00
[52] U.S. Cl. .................................................. 60/39.094
[58] Field of Search ............... 60/39.094, 261, 39.28, 60/734

[56] References Cited

U.S. PATENT DOCUMENTS

| | | | |
|---|---|---|---|
| 2,712,218 | 7/1955 | Ritter | 60/39.094 |
| 2,814,931 | 12/1957 | Johnson | 60/261 |
| 2,865,166 | 12/1958 | Holbrook | 60/241 |
| 3,128,598 | 4/1964 | Gordon | 60/261 |
| 3,738,107 | 6/1973 | Miller | 60/241 |
| 3,793,838 | 2/1974 | Nash | 60/261 |
| 3,841,089 | 10/1974 | Clark | 60/39.094 |
| 4,038,817 | 8/1977 | Snow et al. | 60/261 |
| 4,066,386 | 1/1978 | Johnson et al. | 60/39.094 |
| 4,206,595 | 6/1980 | Cole | 60/39.094 |
| 4,423,595 | 1/1984 | McLean | 60/39.094 |

FOREIGN PATENT DOCUMENTS 664245 1/1952 United Kingdom ............. 60/39.094

Primary Examiner—Louis J. Casaregola
Assistant Examiner—Timothy S. Thorpe
Attorney, Agent, or Firm—Donald J. Singer; Bobby D. Scearce

[57] ABSTRACT

A novel drain system for venting excess fuel from the fuel pump of a jet engine, and particularly the augmenter pump of a jet engine afterburner, is described which comprises a drain line connected at a first end to the vent valve of the fuel pump and at a second end to the main fuel supply line for the engine, for draining the excess fuel from the pump to the main fuel line, a check valve in the drain line near the second end thereof for restricting fuel flow through the drain line in a direction from the first end to the second end, and a vent line having a restriction therein defining an orifice of predetermined size connecting the drain line to an overboard dump port open to ambient.

9 Claims, 3 Drawing Figures

FUEL PUMP VENT DRAIN SYSTEM

RIGHTS OF THE GOVERNMENT

The invention described herein may be manufactured and used by or for the Government of the United States for all governmental purposes without the payment of any royalty.

BACKGROUND OF THE INVENTION

The present invention relates generally to improvements in fuel systems for turbofan jet engines, and more particularly to a novel system and method for draining excess fuel from the fuel pump of a jet engine afterburner following augmentor shutdown to prevent sudden dumping of the excess fuel.

During flight testing of a conventional jet aircraft powered by an augmented turbofan jet engine, it was reported that the aircraft would leave a large white puff of vapor during deceleration from augmented flight to nonaugmented flight. The puff was reported to be quite large and disclosed the position of the aircraft to both ground and air observation. It was determined that this presents an unacceptable hazard for operation of the aircraft within any potentially hostile environment.

In the operation of a jet engine afterburner, the fuel pressure is reduced in the augmenter fuel pump after augmented operation is terminated, and a vent valve on the pump is opened to allow the excess fuel in the augmenter pump to drain out for jettisoning overboard of the aircraft. In existing systems, most of the excess fuel is drained overboard in less than one second, which generates a white puff of vapor as a short vapor trail. Existing systems include the use of drain cans attached to the engine for collection of the excess fuel from the augmenter fuel pump; the cans are unacceptably large and heavy for many applications. Another system includes piping the excess fuel from the pump and back to the exhaust gas. This arrangement does not solve the vapor problem because the ejected fuel cools and becomes a white vapor trail two to three aircraft lengths behind the aircraft.

The present invention substantially eliminates the white vapor characteristic of augmenter fuel pump venting in conventional turbofan jet engines. The augmenter fuel pump drain system of the present invention may be applicable to all existing augmented turbofan jet engines.

It is, therefore, a principal object of the present invention to provide a novel system and method for venting excess fuel from the augmenter pump of a turbofan jet engine following augmenter shutdown.

It is a further object of the present invention to improve stealthiness of a jet aircraft by substantially eliminating visible vapor occurring upon dumping of excess fuel from the augmenter fuel pump.

These and other objects of the present invention will become apparent as the detailed description of certain representative embodiments thereof proceeds.

SUMMARY OF THE INVENTION

In accordance with the foregoing principles and objects of the present invention, a novel drain system for venting excess fuel from the fuel pump of a jet engine, and particularly the augmenter pump of a jet engine afterburner, is described which comprises a drain line connected at a first end to the vent valve of the fuel pump and at a second end to the main fuel supply line for the engine, for draining the excess fuel from the pump to the main fuel line, a check valve in the drain line near the second end thereof for restricting fuel flow through the drain line in a direction from the first end to the second end, and a vent line having a restriction therein defining an orifice of predetermined size connecting the drain line to an overboard dump port open to ambient.

DESCRIPTION OF THE DRAWINGS

The present invention will be more clearly understood from a reading of the following detailed description in conjunction with the accompanying drawings wherein.

DETAILED DESCRIPTION

Figure 1:
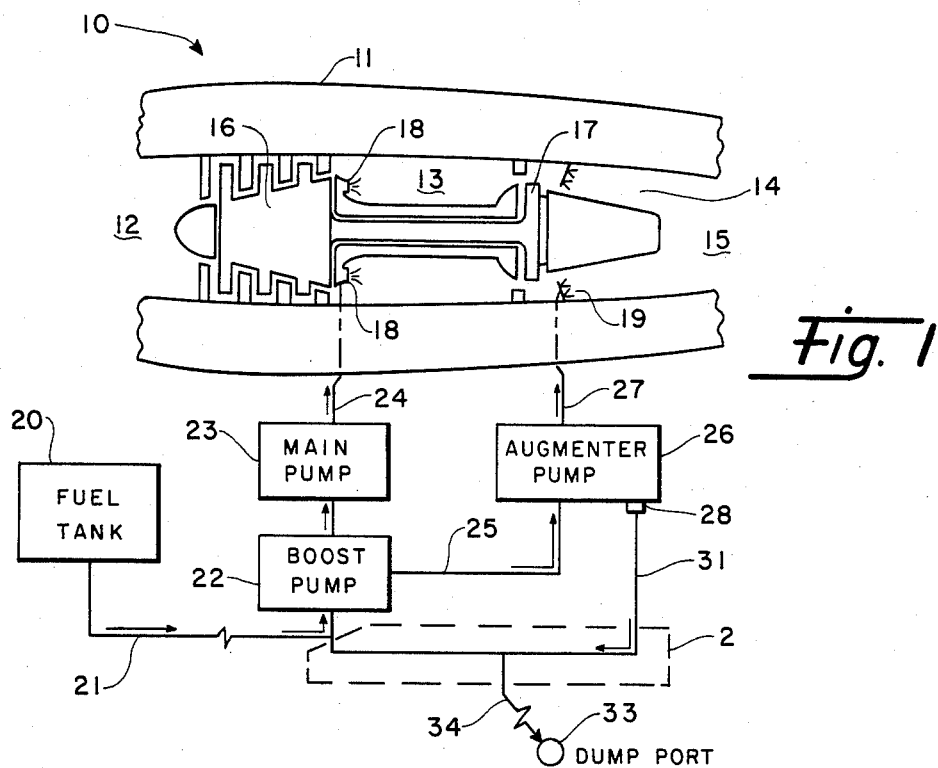
FIG. 1 is a schematic, axial sectional view of a conventional gas turbine engine and associated fuel supply system for the engine and afterburner incorporating the drain system of the present invention.

Referring now to the drawings, FIG. 1 shows a schematic axial sectional view of a conventional gas turbine engine 10, together with a simplistic diagram of the fuel supply system for the engine combustor and afterburner. Engine 10 may conventionally comprise a suitable support structure 11 defining an air inlet and diffuser region 12, combustor region 13, afterburner 14, and discharge region 15. Compressor 16 provides air flow through combustor 13. A turbine 17 is disposed downstream of combustor region 13, substantially as shown. Fuel may be supplied for consumption in the primary combustor region 13 through fuel nozzles 18. Combustion in the afterburner 14 may be supported by fuel supplied through flameholders 19. In conventional fashion, fuel is supplied from one or more tanks, represented by fuel tank 20, through fuel line 21, to engine boost pump 22 for fuel pressurization and passage to main fuel pump and control means 23 and to fuel nozzles 18 through fuel line 24. For augmented engine operation utilizing afterburner 14, fuel is supplied through line 25 to augmenter pump and control means 26 and fuel line 27 to flameholders 19, substantially as shown in FIG. 1.

Figure 2:
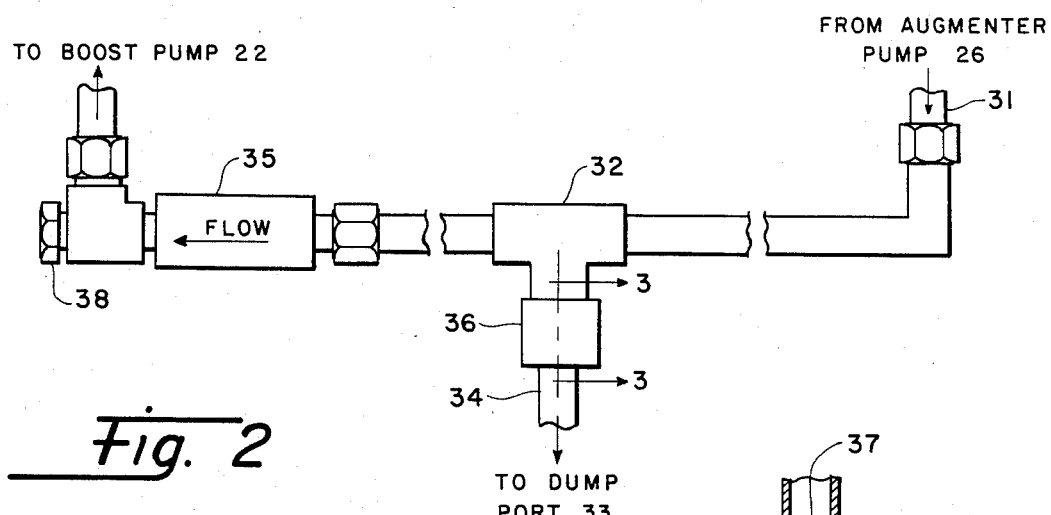
FIG. 2 is a designated portion of FIG. 1 on an enlarged scale showing a schematic of the vent drain system of the present invention.

As discussed above, upon shutdown of augmented engine operation utilizing afterburner 14, existing fuel control systems provided for excess fuel remaining in the augmenter fuel pump 26 to be vented directly overboard. In order to eliminate the vapor puff or trail associated with sudden venting of the augmenter pump 26, the vent system of the present invention may be provided in the fuel system of engine 10 substantially as shown by the dotted outline of a portion of FIG. 1 designated by the numeral 2. The detail of portion 2 of FIG. 1 is shown in the enlarged partial view of FIG. 2.

Figure 3:
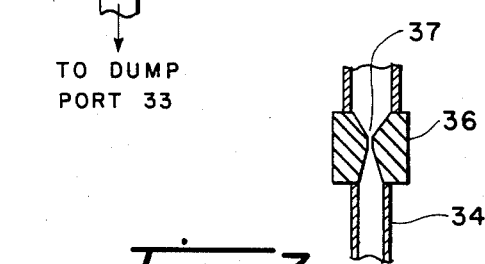
FIG. 3 is a view taken along lines 3—3 of FIG. 2.

In accordance with a preferred configuration, the vent drain system of the present invention may be provided between the augmenter pump 26 and boost pump 22. A drain line 31 is connected at one end to augmenter pump 26 at its vent valve or drain 28, and at the other end to the main engine fuel line 21 near the inlet of boost pump 22. A tee 32 near augmenter pump 26 allows connection of drain line 31 to overboard dump port 33 via vent line 34. Dump port 33 is open to ambient and may preferably be located in the wing tips of the aircraft or in the extreme aft section of the fuselage. A check valve 35 permitting flow only toward boost pump 22 (as indicated by the legend and arrow) is provided in line 31 substantially as shown and preferably as near as practicable to boost pump 22. Check valve 35 is characterized by a small operating pressure differential thereacross (e.g., 1 to 5 psi). Lines 31 and 34, tee 32 and check valve 35 preferably will be of size ⅜-inch (or larger) in order not to unduly restrict flow of fuel therethrough. A restrictor valve 36 in line 34 near tee 32 presents a restriction to fuel flow through line 34 via a constriction or orifice 37 as shown in the schematic sectional view of FIG. 3 taken along lines 3—3 of FIG. 2. Orifice 37 is preferably less than or equal to about 0.035 inch in diameter. For convenience in maintenance of the system, drain plugs may be included at appropriate points such as indicated at 38 in FIG. 2.

In the operation of the system, following afterburner 14 operation and subsequent shutdown of augmented flight, the augmenter fuel pump 26 vent valve 28 opens and any excess fuel in the pump drains into drain line 31. This fuel is at a higher pressure than the fuel in the main engine fuel line 21 by reason of pressurization by boost pump 22 and augmenter pump 26. The pressure is high enough to open the check valve 35 and allow most of the excess fuel to flow into the main engine fuel line 21. At the same time some of the fuel in drain line 31 can drain slowly overboard through the orifice 37 in restrictor valve 36. When the pressure in the drain line 31 drops below the main fuel inlet pressure at boost pump 22, check valve 35 closes and any remaining fuel in line 31 seeps slowly through line 34 and vents overboard through dump port 33. The pressure within lines 31,34 decays to ambient preventing the augmenter pump 26 from overheating and provides low back pressure so that the vent valve 28 will close when pump 26 is turned on.

The total overboard drainage is greatly reduced, and the overboard flow rate is small enough so that any consequent vapor trail is substantially eliminated. The utility of the drain system of the present invention has been successfully demonstrated during a test flight of a representative jet aircraft.

The configuration of the present invention provides a system characterized by light weight, simplicity of operation, fewer parts, lower cost, and superior reliability and performance as compared to existing configurations. The system of the present invention can easily be adapted to any augmented turbofan jet engine and could replace drain can systems now being used or proposed for use on other jet engine types. The system takes little room to mount on the engine, can be easily adapted to almost any engine configuration and, because the system is vented to ambient, its operability is virtually unrestricted in altitude and Mach number.

The present invention, as hereinabove described, therefore provides a novel vent and drain system for the augmenter fuel pump of a jet engine afterburner. It is understood that certain modifications to the invention as described may be made, as might occur to one with skill in the field of this invention, within the scope of the appended claims. Therefore, all embodiments contemplated hereunder have not been shown in complete detail. Other embodiments may be developed without departing from the spirit of this invention or from the scope of the appended claims.

We claim:

1. A fuel drain system for a fuel pump of a jet engine having a fuel supply system including a main fuel supply line for providing fuel to said fuel pump for combustion in said engine, the said pump including valve means for discharging excess fuel from said pump upon termination of operation thereof, comprising:
   a. a drain line, connected at a first end thereof to said valve means on said pump, and including connecting means at the second end thereof for connection to said main fuel supply line of said engine, through which said excess fuel may be drained from said pump;
   b. a check valve in said drain line near said connecting means for allowing flow of fuel through said drain line only in a direction away from said pump and toward said main fuel supply line;
   c. a discharge port open to ambient;
   d. a vent line, operatively interconnecting said discharge port with said drain line at a point intermediate said pump and said check valve, for venting said drain line to ambient; and
   e. means defining an orifice of predetermined size in said vent line near said drain line, said orifice means restricting flow through said vent line to a prescribed slow rate.

2. The fuel drain system as recited in claim 1 wherein said drain line is sized to promote substantially unrestricted fuel flow therethrough.

3. The fuel drain system as recited in claim 2 wherein said check valve operates at a pressure differential of less than about five psi.

4. The fuel drain system as recited in claim 1 wherein the orifice in said vent line is less than about 0.035 inch diameter.

5. In a fuel supply system for jet engine having an afterburner and fuel supply means including a main fuel pump for fueling said engine, an augmenter pump for fueling said afterburner, a boost pump for supplying fuel to said main and augmenter pumps, and a main fuel line for supplying fuel to said boost pump, an improvement comprising:
   a. a drain line, operatively connected at a first end thereof to said augmenter pump and at the second end thereof to said main fuel line, through which excess fuel may be drained from said augmenter pump upon termination of augmented operation of said engine;
   b. a check valve in said drain line near said connecting means for restricting flow of fuel through said drain line from said pump toward said main fuel line;
   c. a discharge port open to ambient;
   d. a vent line, operatively interconnecting said discharge port with said drain line at a point intermediate said pump and said check valve, for venting said drain line to ambient; and
   e. means defining an orifice of predetermined size in said vent line near said drain line, said orifice means restricting flow through said vent line to a prescribed slow rate.

6. The fuel drain system as recited in claim 5 wherein said drain line is sized to promote substantially unrestricted fuel flow therethrough.

7. The fuel drain system as recited in claim 6 wherein said check valve operates at low pressure differential.

8. The fuel drain system as recited in claim 5 wherein the orifice in said vent line is less than about 0.035 inch diameter.

9. The fuel drain system as recited in claim 5 wherein said boost pump supplies fuel to said main and augmenter pumps at increased pressure.

* * * * *